United States Patent [19]
Hase et al.

[11] Patent Number: 5,475,715
[45] Date of Patent: Dec. 12, 1995

[54] SYNC DATA INTRODUCTION METHOD AND SYSTEM

[75] Inventors: Kenichi Hase; Syoichi Miyazawa; Ryutaro Horita, all of Yokohama; Akihiko Hirano, Fujisawa; Hiroshi Kimura, Yokohama; Akira Uragami, Takasaki, all of Japan

[73] Assignee: Hitachi, Ltd., Tokyo, Japan

[21] Appl. No.: 886,860

[22] Filed: May 22, 1992

[30] Foreign Application Priority Data

May 24, 1991 [JP] Japan ................................. 3-120264

[51] Int. Cl.$^6$ ........................................................ H04L 7/00
[52] U.S. Cl. ........................... 375/354; 375/371; 375/357; 375/376; 327/144
[58] Field of Search ...................................... 375/340, 354, 375/359, 362, 371, 373, 375, 376, 357; 327/141, 144–150, 153

[56] References Cited

U.S. PATENT DOCUMENTS

| 4,425,646 | 1/1984 | Kinoshita et al. | 375/118 |
|---|---|---|---|
| 4,504,960 | 3/1985 | Yamada | 375/94 |
| 4,633,488 | 12/1986 | Shaw | 307/269 |
| 4,947,407 | 8/1990 | Silvian | 375/94 |
| 4,982,110 | 1/1991 | Yokogawa et al. | 328/63 |

OTHER PUBLICATIONS

V. Condito, et al., "A 18MB/S Bicmos Disk Drive Date Separator", IEEE 1990 Custom Integrated Circuits Conference pp. 15.2.1–15.2.4.

Primary Examiner—Stephen Chin
Assistant Examiner—Hai H. Phan
Attorney, Agent, or Firm—Antonelli, Terry, Stout & Kraus

[57] ABSTRACT

A data device for introducing the data read from a recording medium includes first creation device for receiving a read code signal corresponding to the data stored on a data recording medium to create first two phase signals which repeat inversion with a substantially equal period to each other on the basis of a change in the waveform of the read code; second creation device for receiving the first two phase signals to create second two phase signals with their one phase occupying most of their period having an overlapping portion with each other, the period being twice as long as that of the first two phase signals; and third creation device for receiving the read code signal and said second two phase signals to create a second code signal corresponding to the read code signal which shifts during the one phase period of said second two phase signals. The second two phase signals serve to extend sufficiently the window for introducing the read code to provide stabilized read for the data including jitter due to rotation fluctuation of the recording medium.

21 Claims, 10 Drawing Sheets

SYNC DATA INTRODUCTION

PRIOR ART SYNC DATA INTRODUCTION

PRIOR ART WINDOW THEORY

PRIOR ART LATCH CIRCUIT

TIMING CHART

SYNC DATA INTRODUCTION

EXTENDED WINDOW CREATION THEORY

EXTENDED WINDOW CREATION CIRCUIT

EXTENDED WINDOW CREATION CIRCUIT

EXTENDED WINDOW CREATION CIRCUIT

LATCH CIRCUIT

TIMING CHART IN LATCH CIRCUIT

FIG. 11A

DATA DISCRIMINATION

| CONDITION | NUMBER OF BIT "0" (S) | BIT "1" TO BE CANCELED |
|---|---|---|
| TWO SUCCESSIVE BIT "1" S | FRONT > REAR<br>FRONT < REAR | FRONT<br>REAR |
| THREE SUCCESSIVE BIT "1" S | | CENTER |
| FOUR SUCCESSIVE BIT "1" S | FRONT > REAR<br>FRONT < REAR<br>FRONT = REAR | FIRST AND THIRD<br>SECOND AND FOURTH<br>SECOND AND THIRD |
| ⋮ | ⋮ | ⋮ |

FIG. 11B  FIRST EXAMPLE

LATCH CODE  0 1 0 0 0 1 1 0 1 0
  13
FRONT — CANCEL X — REAR
LARGE — TWO SUCCESSIVE — SMALL

FIG. 11C  SECOND EXAMPLE

LATCH CODE  0 1 0 0 1 1 1 0 1 0
  13
CANCEL X
THREE SUCCESSIVE

FIG. 11D  THIRD EXAMPLE

LATCH CODE  0 1 0 1 1 1 1 0 1 0
  13
FRONT — CANCEL X X — REAR
FOUR SUCCESSIVE

SYNC DATA INTRODUCTION SYSTEM

SYNC DATA INTRODUCTION METHOD AND SYSTEM

CROSS-REFERENCE TO RELATED APPLICATIONS

The present application is related to the commonly assigned, U.S. Pat. No. 5,222,002 entitled "SEMICONDUCTOR INTEGRATED CIRCUIT WHICH PERFORMS PHASE SYNCHRONIZATION", issued to Hase, et al. on Jun. 22, 1993. The disclosure of this application is incorporated herein by reference.

BACKGROUND OF THE INVENTION

1. Field of the Invention

The present invention relates to taking-in or introduction of data with great jitter due to interference between codes, and more particularly to taking-in of sync or phase-locked data for improving permissible phase shift, jitter or margin in a reproduction signal in a data read-out circuit of an optical magnetic disk, an optical disk and a magnetic disk drive.

2. Description of the Related Art

Now referring to FIGS. 1, 2 and 3, an explanation will be given of the conventional sync or phase-locked data introduction system and circuit.

FIG. 1 shows an arrangement of the conventional sync data taking-in or introduction system. As seen from FIG. 1, this system is composed of a phase-locked loop (PLL) 4 and a latch 14. In operation, a read code signal 5 which is read, detected in its peak and pulsated is introduced in PLL 4 which generates a sync or phase-lock clock in synchronism or phase-locked with the read code 5. The latch 14 takes in the read code 5 as a sync data with the sync clock generated by PLL 4 and transfers it a read data 6 as well as a read clock 7 to a succeeding stage.

FIG. 2 shows the principle of a window, i.e., a period which can be used for data introduction during one period of a VCO (voltage controlled oscillator). In FIG. 2, VCO-P 8 and VCO-N 9 denote two-phase phase-inverted sync clocks generated by PLL 4 or VCO outputs. As seen from FIG. 2, a conventional window 15, which is conceptually taken as a discrimination window for deciding whether each bit of the read code 5 is "1" or "0", ranges from the rising edge of VCO-P 8 to a succeeding rising edge, and the rising edge of VCO-N 9 is centered within the window. Ideally, this window has a width corresponding to one period of VCO-P 8 (or VCO-N 9). If the rising edge of the read code is detected within the range of one period, the data at the corresponding bit is decided to be "1". However, an actual window 16, as described later, involves window loss 17 containing several kinds of elements. This window has a relatively short width with the window loss subtracted from one period length (i.e., one bit length of the read code 5) of VCO-P 8 (or VCO-N 9). Thus, only if the rising edge is detected within the window, the data "1" is correctly recognized. As a result, the window loss may lead to an erroneous operation.

With reference to FIGS. 3A and 3B, a concrete explanation will be given of the operation of an exemplary conventional latch circuit. As seen from FIG. 3A, the conventional latch circuit is composed of two D-type flip-flops FF 141 and FF 142, and a two-input NAND 143. A read gate 18 fixed at high "H" is taken in FF 141 at the rising edge of the read code 5. Then, it is assumed that the rising edge of the read code 5 is synchronous with that of VCO-P 8 generated by PLL 4. An output 144 from FF 141 is taken in FF 142 at the rising edge of VCO-N 9 to be outputted as a read data 6. A CL input of FF 142 is also set at "H". Then, the NAND output of the output 144 from FF 141 and the read data 6 resets FF 141 so that the rising edge of the read code 5 is waited again.

A typical latch circuit similar to the above conventional latch circuit is disclosed in e.g., an article, V. Condito et al "A 18 MB/S BICMOS DISK DRIVE DATA SEPARATOR" in Proceedings 15.2.1–15.2.4 of IEEE CUSTOM INTEGRATED CIRCUITS CONFERENCE held in 1990.

The above prior art has the following defects. The width of the window 16 becomes theoretically smaller than one period of VCO-P 8 (or VCO-N 9) due to window loss. Specifically, the ideal window 15 is narrowed by the window loss 17 including a difference in delay of a read code signal in the latch 14 and VCO, an ordinary phase difference between the data and clock in PLL 4, a phase shift between the edges of VCO-P 8 and VCO-N 9 and a jitter component of the read code 5. This provides an actual window 16 with a narrowed width. Thus, the window loss may lead to some lack or error in the data.

In particular, in high speed data transfer required in recent years, the width of one period of VCO-P 8 or VCO-N 9 has become short so that the accuracy of transfer will be relatively greatly influenced by the window loss; this is an obstacle to high speed data transfer.

SUMMARY OF THE INVENTION

An object of the present invention is to prevent malfunction due to window loss to realize an always stabilized sync data introduction or taking-in system.

Another object of the present invention is to remove an obstacle to high speed data transfer due to presence of window loss so as to handle required high speed data transfer.

Still another object of the present invention is to provide a sync data introduction system which is useful for the signal having the jitter composition exceeding the ± half period of VCO which cannot be taken in by the prior art. In order to attain the above objects, the sync data introduction system according to the present invention, in taking in data by a clock in synchronism with the data, creates at least two phase discrimination windows each having the width of at least one bit length of the data, takes in the data within each discrimination window, and decides whether the taken-in data at issue is right or wrong on the basis of the pattern of the data taken in for all the discrimination windows, thereby correcting the error of the data.

The sync data introduction system according to the present invention in which a data is taken in by a clock in synchronism or phase-locked with the data includes an extended window creation unit for creating at least two-phase data taking-in discrimination window signals each having the width of at least one bit length of the data, a latch unit for taking in the data within each discrimination window of the extended window creation unit, and a data discrimination unit for deciding whether the taken-in data at issue is right or wrong.

In the sync data introduction circuit according to the present invention, the extended window creation unit creates at least two-phase data taking-in discrimination window signals each having the width of at least one bit length of the data. The latch unit takes in the data within each discrimination window of the extended window creation unit. The data discrimination unit decides whether the data taken in by the latch unit is right or wrong.

In accordance with the present invention, the extended window creation unit creates at least two-phase window signals having preferably overlapped discrimination window portion to take in data within each discrimination window so that lack in the data can be prevented. Although overlapped data introduction that the same bit "1" is taken in by plural phase discrimination windows will occur, it is possible to extract selectively a right code(s) of the read codes taken in by deciding the pattern of the data taken by all the phase discrimination windows on the basis of the property (manner of coding discontinuous bits "1", influence by a peak shift, etc.) of the read code.

The above and other objects and features of the present invention will be more apparent from the following description taken in conjunction with the accompanying drawings.

BRIEF DESCRIPTION OF THE DRAWINGS

FIGS. 11A to 11D are views for explaining the system of the data discrimination unit in FIG. 4.

DESCRIPTION OF THE PREFERRED EMBODIMENTS

Figure 1:
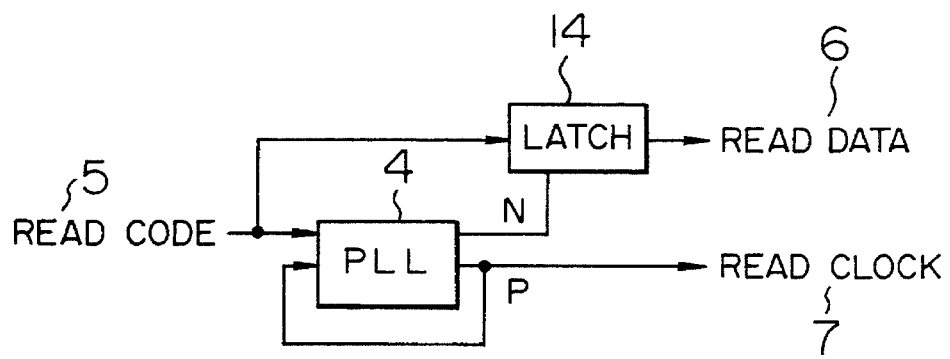
FIG. 1 is a block diagram showing a conventional sync data introduction unit.
Figure 2:
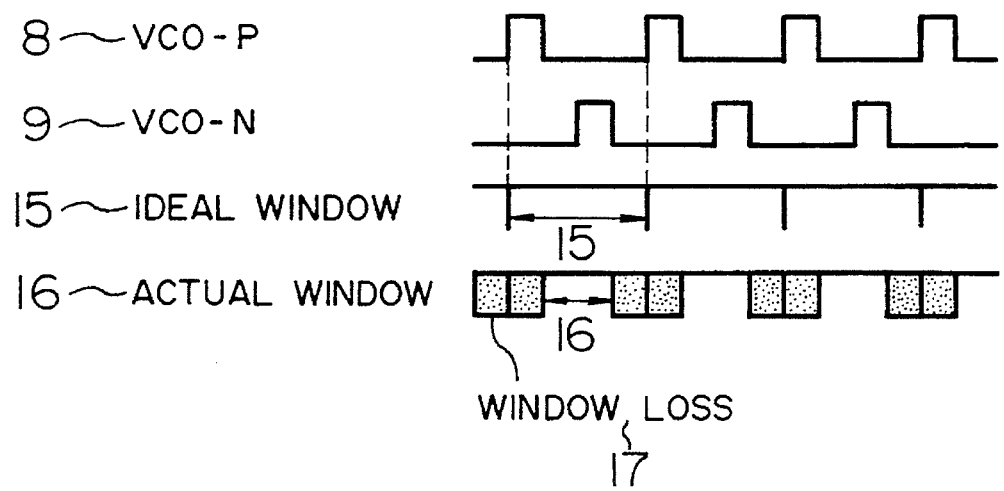
FIG. 2 is a waveform chart for explaining the principle of a conventional window.
Figure 3A:
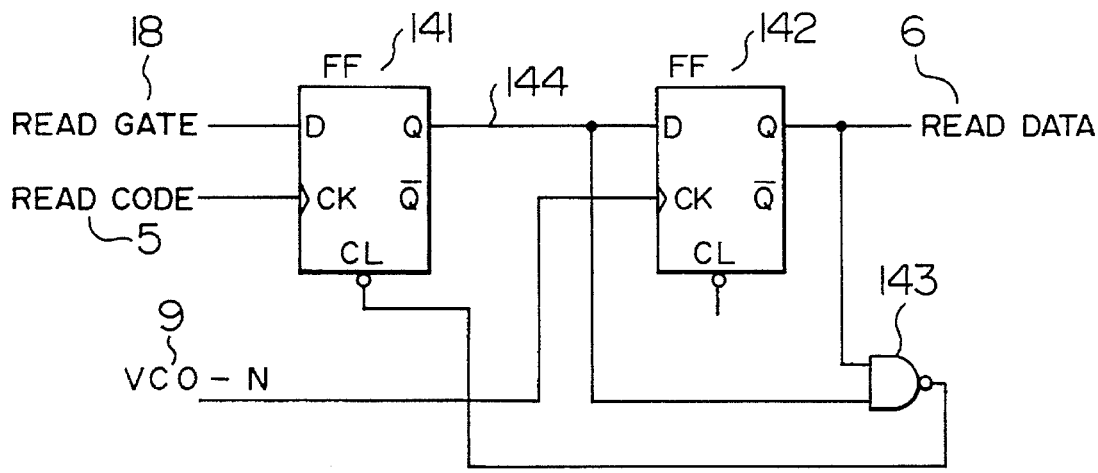
FIGS. 3A and 3B are views for explaining the operation of a conventional latch circuit.
Figure 3B:
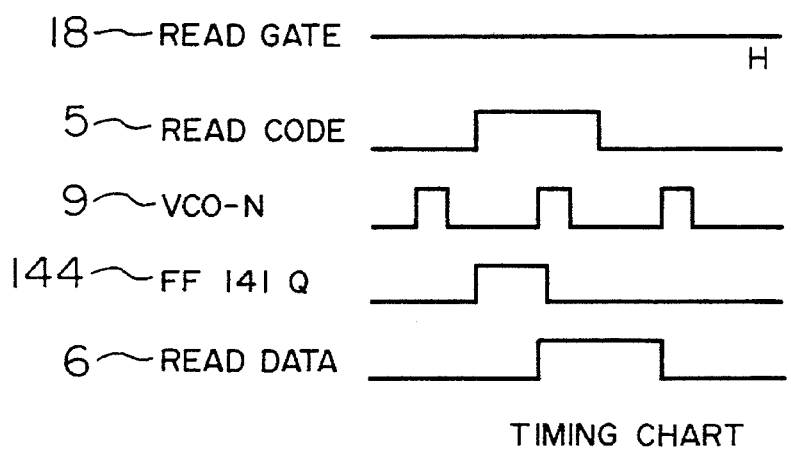
Figure 4:
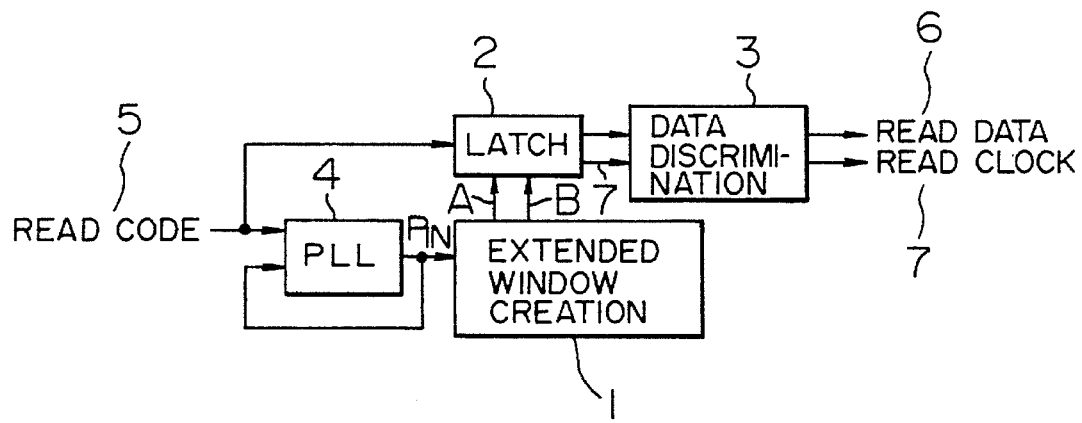
FIG. 4 is a block diagram of a data introduction circuit according to one embodiment of the present invention.

FIG. 4 shows in block form an arrangement of the sync data introduction system according to the present invention. As seen from FIG. 4, the sync data introduction system includes an extended window creation unit 1, a latch 2 and a data discrimination unit 3. The system also includes a PLL 4 for generating a sync clock which is precedent to the extended window creation unit 1. In response to the read code 5 which is a pulsated signal such as a signal read from a disk, PLL 4 generates sync or phase-locked clocks to be delivered to the extended window creation unit 1. In response to the sync clocks, the extended window creation unit 1 creates plural window signals to be sent to the latch 2. The latch 2 takes in the read code using the plural window signals. The data discrimination unit 3 decides whether the read code latched in the latch 5 is right or wrong and sends only the right read code as a read data 6 to the succeeding stage together with a read clock phase-locked with the read data 6. In the embodiment of FIG. 4, the clock phase-locked with the read code is generated by PLL 4, but the clock phase-locked with the read code 5 may be previously prepared. If the prepared clock has been subjected to the measure for preventing malfunction due to delay error and jitter resulting from an intervenient cable, another circuit including the latch 2, the data discrimination unit 3 and the extended window creation unit 1 can be proposed within the scope of the present invention.

Figure 5:
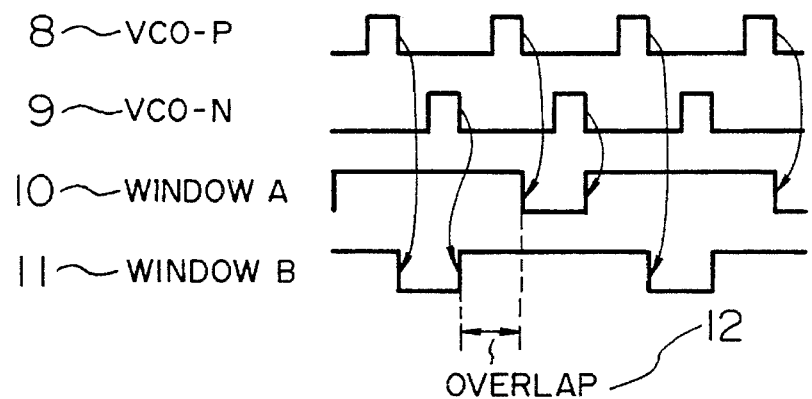
FIG. 5 is a waveform for explaining the operation of the window creation unit in FIG. 4.

FIG. 5 shows a timing chart for explaining the principle of creating extended window signals in the extended window creation unit 1. VCO-P 8 and VCO-N 9 denote sync clocks created by PLL 4. Usually, PLL 4 operates so that the rising edge of VCO-P 8 agrees with that of the read code 5, and thus the rising edge of VCO-N 9 serves as an edge of introducing the read code 5. Then, the conventional window ranges from the rising edge of VCO-P 8 to a succeeding rising edge, and the rising edge of VCO-N 9 is centered within the window. On the other hand, in this embodiment, output windows A 10 and B 11, from the extended window creation unit 1 are two phase signals each having a period twice as long as that of VCO-P 8 (or VCO-N 9); the phases of these signals are inverted (i.e. 180° shifted from each other). The high level portions of the windows A 10 and B 11 serve as a set of extended windows, and each extended window has a width greater than one period of VCO-P 8 (or VCO-N 9). Thus, high level portions of the windows A 10 and B 10 have an overlapping portion 12. This overlapping portion 12 can extend the window. However, if the data of the read code 5 is located at the overlapping portion 12, it may be introduced into plural windows. So the data discrimination unit 3 performs the processing of avoiding such overlapping introduction. Incidentally, in this embodiment, two phase window signals were used, but in view of the characteristics of the read code 5 and its jitter component, more plural phase window signals may be used and a signal having a different window width may be used together.

Figure 6A:
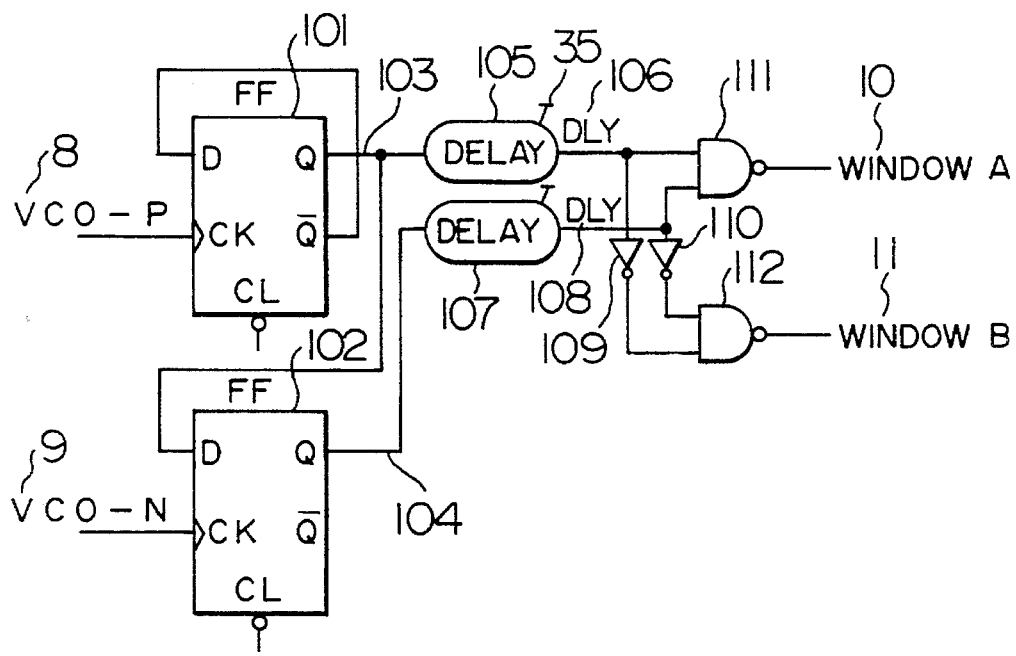
FIGS. 6A and 6B are a circuit diagram of the extended window creation unit in FIG. 4 and the corresponding timing chart, respectively.
Figure 6B:
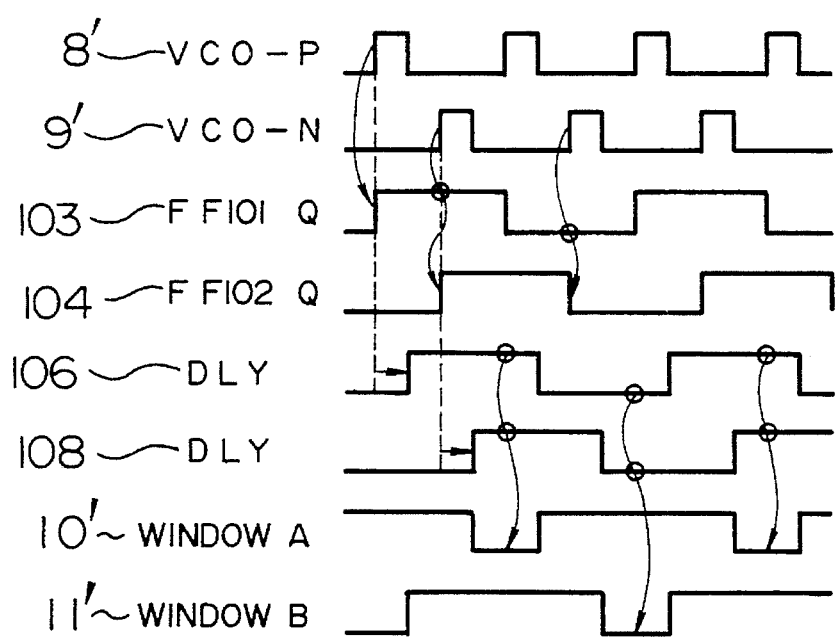

FIGS. 6A and 6B show a circuit configuration of the extended window creation unit 1 according to another embodiment of the present invention and a timing chart of the corresponding operation. The extended window creation unit 1 is composed of two D-type flip-flops (FFs) 101, 102, two window extension delay circuits 105, 107 and two inverters 109, 110 and two NANDs 111, 112. With reference to the timing chart of FIG. 6B, an explanation will be given of the operation of the circuit configuration of FIG. 6A. Sync clocks VCO-P 8 and VCO-N 9 created by PLL 4 (FIG. 4) are frequency-divided by FFs 101 and 102, respectively to provide two phase clocks 103 and 104 out of phase by a half period of an original VCO signal from each other. The clock 103 resulting from frequency division of VCO-P 8 is delayed by the delay circuit 105 to provide a delayed clock (DLY) 106. On the other hand, the clock 104 resulting from frequency division of VCO-N 9 is delayed by the delay circuit 107 to provide a delayed clock (DLY) 108. A window A 10 can be obtained as an NAND output of the delayed clocks 106 and 108 whereas a window B 11 can be obtained as an NAND output of the inverted signals of the delayed clocks 106 and 108. A feature of the extended window creation unit 1 according to this embodiment resides in that the delay circuits 105 and 107 can individually extend the window in a forward direction and a rear direction to one period of a VCO pulse, respectively. Another feature resides in that using the delay circuit with a variable means makes it easy to locate the rising edge of VCO-P 8 at the center of the extended window.

Figure 7A:
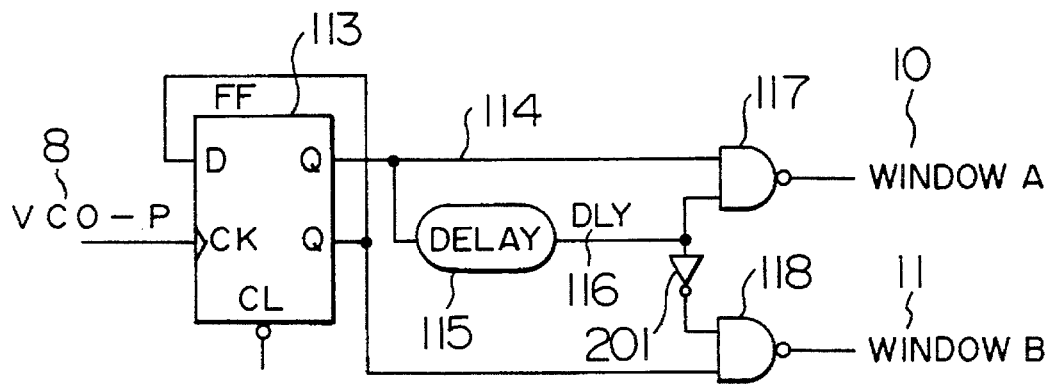
FIGS. 7A and 7B are another circuit diagram of the extended window creation unit in FIG. 4 and the corresponding timing chart, respectively.
Figure 7B:
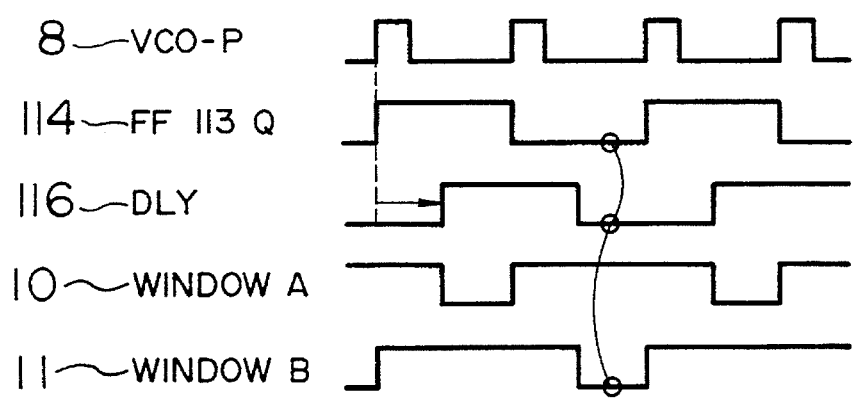

FIGS. 7A and 7B show another circuit configuration of the extended window creation unit 1 and a timing chart of the corresponding operation. This circuit configuration is composed of a D-type flip-flop (FF) 113, a window extension delay circuit 115, an inverter 201 and two NANDs 117, 118. With reference to the timing chart of FIG. 7B, an explanation will be given of the operation of the circuit configuration of FIG. 7A. A sync clock VCO-P 8 created by PLL 4 (FIG. 4) is frequency-divided by FF 113. The clock 114 resulting from frequency division of VCO-P 8 is delayed by the delay circuit 115 to provide a delayed clock (DLY) 116. A window A 10 can be obtained as an NAND output of the frequency-divided clock 114 and the delayed clock 116 whereas a window B 11 can be obtained as an NAND output of the inverted signals of the frequency-divided clock 114 and the delayed clock 116. An feature of this circuit configuration resides in that since the extended windows are created by a single delay circuit 115, it can be greatly simplified as compared with that of FIG. 6A. However, since the center of the extended window shifts in accordance with the delay amount of the delay circuit 115, it is desired to Jointly use a circuit for adjusting the center of a window relatively largely.

Figure 8A:
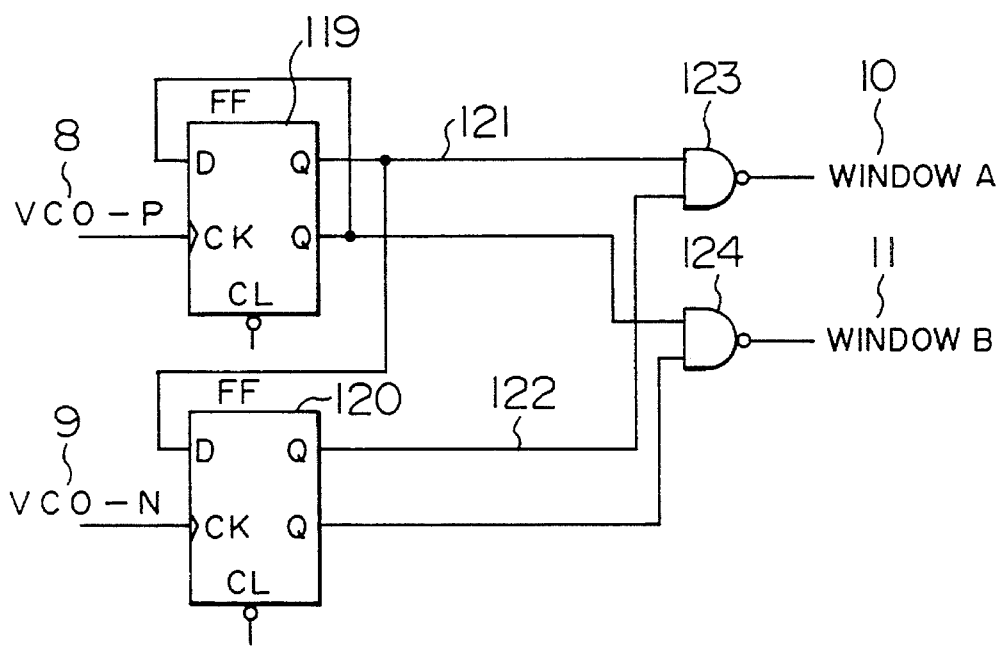
FIGS. 8A and 8B are another circuit diagram of the extended window creation unit in FIG. 4 and the corresponding timing chart, respectively.
Figure 8B:
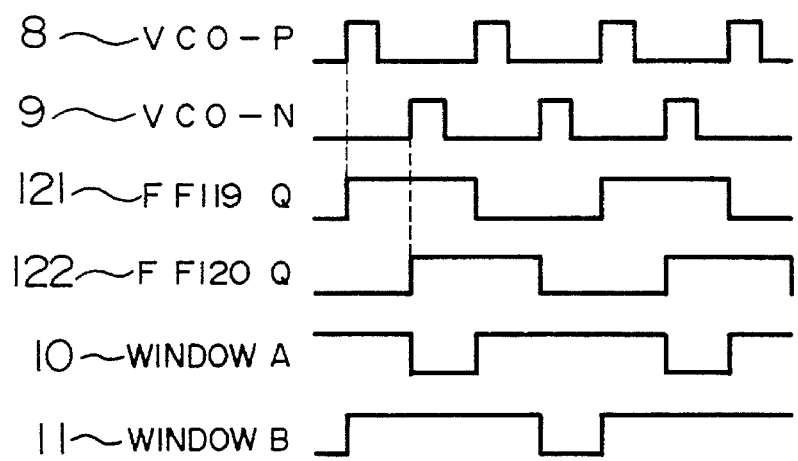

FIGS. 8A and 8B show a still another circuit configuration of the extended window creation unit 1 and a timing chart of the corresponding operation. This circuit configuration is composed of two D-type flip-flops (FFs) 119, 120 and two NANDs 123, 124. With reference to the timing chart of FIG. 6B, an explanation will be given of the operation of this circuit configuration. Sync clocks VCO-P 8 and VCO-N 9 created by PLL 4 (FIG. 4) are frequency-divided by FFs 119 and 120, respectively to provide two phase clocks 121 and 122 out of phase by a half period of an original VCO signal from each other. A window A 10 can be obtained as an NAND output of the clocks 121 and 122 whereas a window B 11 can be obtained as an NAND output of the inverted signals of the delayed clocks 121 and 122. A feature of the circuit of FIG. 8A resides in that it does not have any delay circuit for extending the window and hence can be further simplified as compared with that of FIG. 7A. However, it should be noted that the width of each window is limited to 1.5 times as large as one period of VCO-P 8 (or VCO-P 9). Further, as in the circuit configuration of FIG. 7, it is desired to jointly use a delay circuit with the means for adjusting the center of a window. Additionally, all the examples of the circuit configuration of the extended window creation unit 1 were directed to creation of two phase window signals. But those skilled in the art can easily propose a circuit configuration capable of creating three or more phase window signals or window signals having different widths for respective phases.

Figure 9:
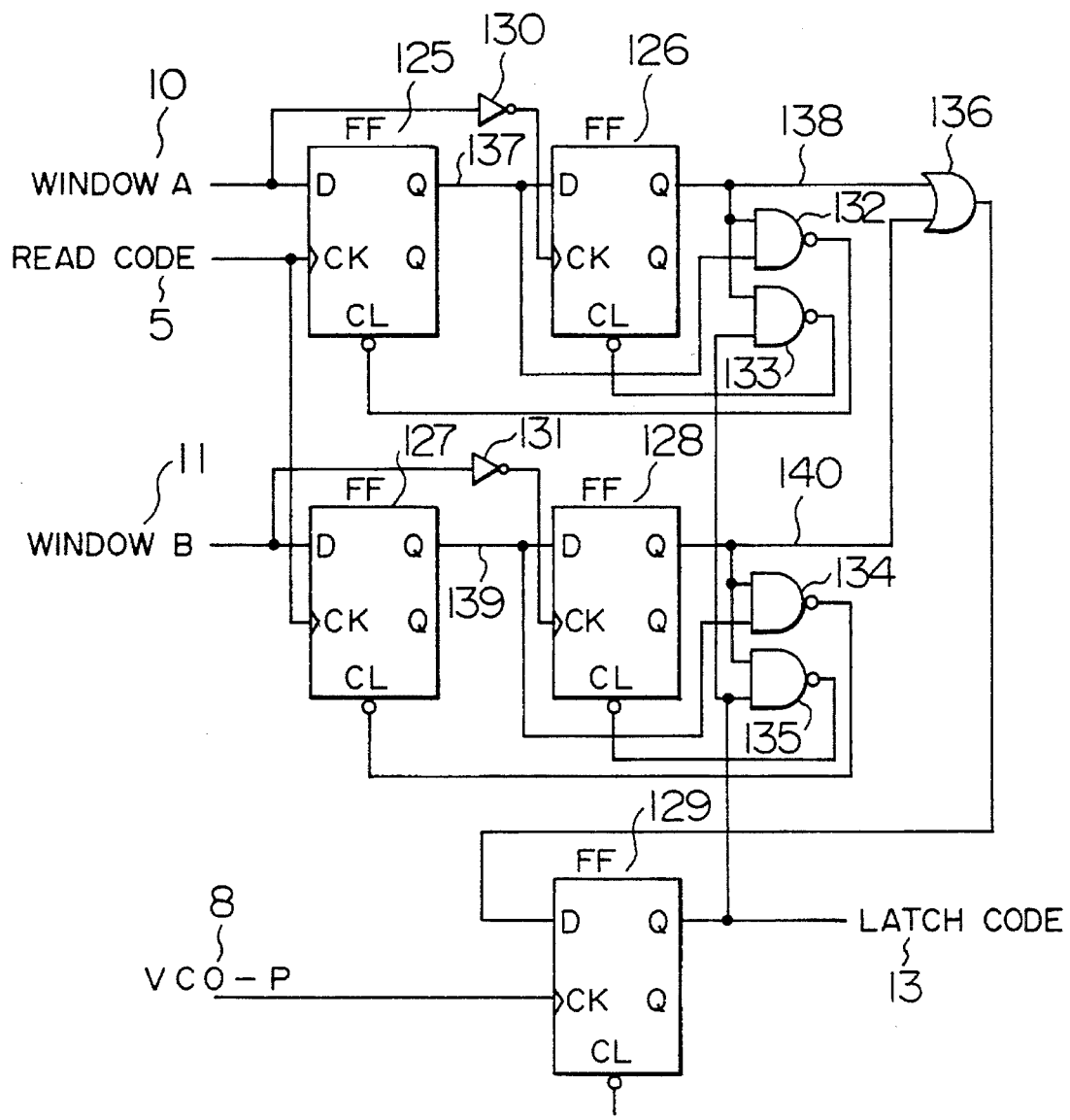
FIG. 9 is a circuit diagram of the latch unit in FIG. 4.
Figure 10:
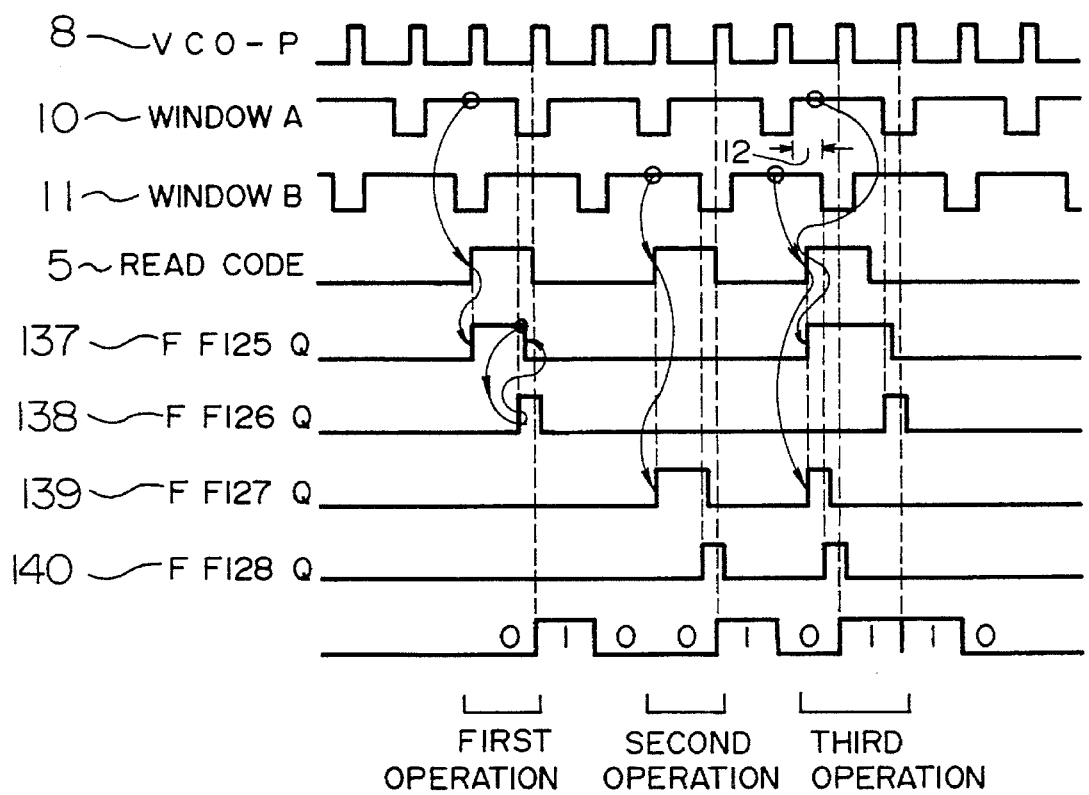
FIG. 10 is a timing chart of the latch unit circuit in FIG. 9.

FIGS. 9 and 10 show a circuit configuration of the latch 2 (FIG. 4) and a timing chart of the corresponding operation. This circuit configuration is composed of five D-type flip-flops (FFs) 125 to 129, two inverters 130, 131, four two-input NANDs 132 to 135, and a two-input OR 136.

With reference to FIG. 10, an explanation will be given of this circuit configuration of the latch 2. In the first operation state where the rising edge of the read code 5 is located within the window A 10, the "H" (high) information in the window A 10 is taken into FF 125 at the rising edge of the read code 5. A Q output 137 from FF 125 is taken into FF 126 at the falling edge of the window A 10. Then, FF 125 is reset with slight delay as shown by an NAND output of the output 137 from FF 125 and the output 138 from FF 126, and hence waits for an input of the read code 5 again. The output 138 from FF 126 is taken into FF 129 at the rising edge of VCO-P 8 through the two-input OR 136. The output from FF 129 is produced as a latch code having a pulse width equal to one period of VCO-P 8. FF 126 is reset by an NAND output of the output 138 of itself and the latch code 13, and hence enters an input waiting state again. In the Second operation state where the rising edge of the read code 5 is located within the window B 11, the "H" (high) information in the window B 11 is taken into FF 127 at the rising edge of the read code 5. A Q output 139 from FF 127 is taken into FF 128 at the falling edge of the window A 10. Then, FF 127 is reset with slight delay as shown by an NAND output of the output 139 from FF 127 and the output 140 from FF 128, and hence waits for an input of the read code 5 again. The output 140 from FF 128 is taken into FF 129 at the rising edge of VCO-P 8 through the two-input OR 136. The output from FF 129 is produced as a latch code having a pulse width equal to one period of VCO-P 8. FF 128 is reset by an NAND output of the output 140 of itself and the latch code 13, and enters an input waiting state again. In the third operation state where the rising edge of the read code 5 is located within an overlapping portion 12 of the windows A 10 and B 11, the first operation state occurs successively to the second operation state; otherwise the second operation state occurs successively to the first operation state. As a result, in response to one rising edge of the read code 5, the latch 13 is produced as an output having a pulse width equal to two periods of VCO-P 8, i.e., a code composed of successive two bits. Selecting a correct code from the successive two bit code can be performed by the succeeding data discrimination unit 3.

Another circuit configuration of the latch 2 can be in such a way that with the two-input OR 136 removed from FIG. 9, the output 138 is connected with the D input of FF 129 and the D input is connected with line 140 so that two sets of the latch code 13 are outputted in two paths. The feature of this circuit configuration resides in that it can be also applied to the case where a large number of outputs from the extended window creation unit 1 are prepared and a plurality of latch codes 13 are processed by the succeeding data discrimination unit 3.

With reference to FIG. 11, an explanation will be given of several examples of the discrimination method in the data discrimination unit 3. A method shown in FIG. 11A is useful to deal with the jitter component due to peak shift when a code with no successive bits "1"s is read from the RLL (Run-Length-Limited) codes stored on a magnetic disk. As described above, if the read code 5 is located within the overlapping portion 12, the latch 2 produces the latch code of "11" in response to one bit "1" of the read code 5. So, using the number of "0"s included in the front and rear groups of latch code pulse patterns, the data discrimination unit 3 must decide the erroneous latch code pulse "1" to cancel it.

The first example shown in FIG. 11B is the case where two bits "1"s occur in succession. In this case, it is decided that the read code 5 should include one bit "1" (i.e., the existing edge is single) considering the property of the peak shift of moving adjacent bits "1"s away from each other on a time base. Namely, it is decided that the two successive "1"s are due to the influence of the bit "1" nearer of the bits "1" before and after them. Thus, the bit "1" difficult to be influenced, i.e., the bit "1" adjacent to the group (front group in this example) including more "0"s of front and rear groups of "0"s adjacent to "11" is canceled.

The second example shown in FIG. 11C is the case where three bits "1"s occur in succession. In this case, it is decided that in view of the above property, the read code 5 includes two bits "1"s which are not successive. Thus, the center bit "1" is canceled.

The third example shown in FIG. 11D is the case where four bits "1" occur in succession. In this case, it is decided that in view of the above property, the read code 5 includes two bits "1"s. If the front group and the rear group include the same number of "0"(s), in view of the symmetry of the bits "1" before and after, the central "11" bits are canceled. If the front group includes a more number of "0"s than the rear group, the first and third "1"s are canceled. If the rear group include a more number of "0"s, the second and fourth "1"s are canceled. FIG. 11A wholly shows bits to be canceled until up to four bits "1"s occur in succession. But it should be noted that the examples shown in FIG. 11A takes only the influence from peak shift into consideration. The processing to be performed actually should be optimized for each system considering other influence. The above processing may be applied for the Viterbi decoding method.

Another discriminating method in the data discrimination unit 3 can be performed in such a way that the extended window creation unit 1 creates many window signals with different window widths and the latch 2 is the above second circuit configuration which processes latch codes taken in individually (not shown). The processing according to this method can be implemented by comparing outputs of plural latch codes 13 with a conversion table previously prepared or directly processing the latch codes 13 by means previously prepared such as the Viterbi decoding method.

Figure 12:
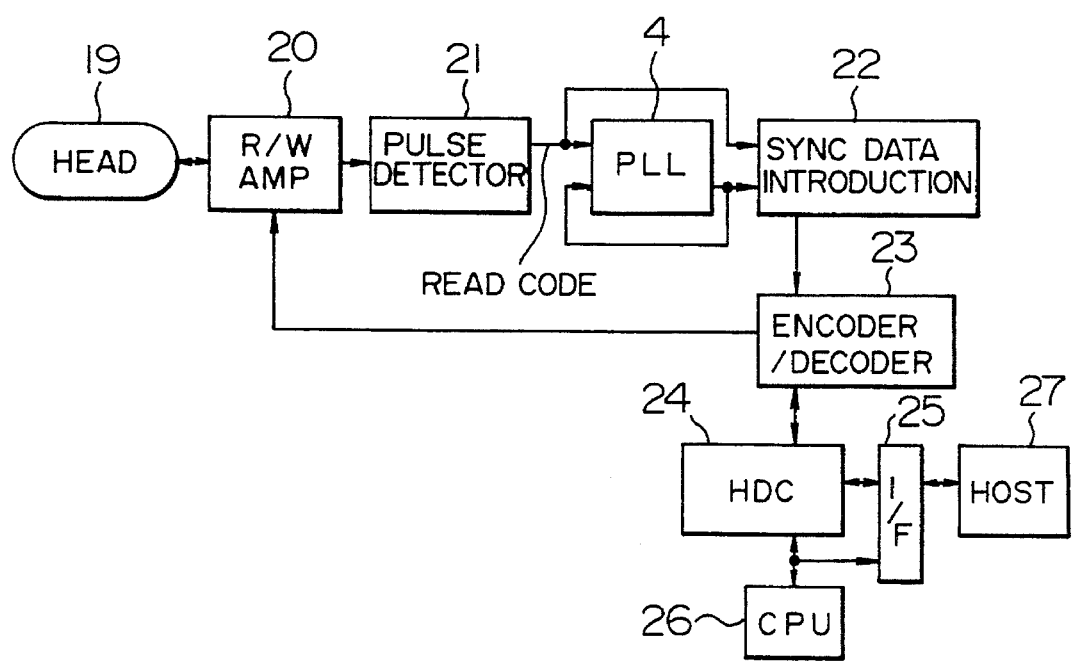
FIG. 12 is a block diagram of a system including the sync data introduction system according to the present invention.

FIG. 12 shows an arrangement of one embodiment of the system including the sync data introduction system according to the present invention. This system is suitable to a magnetic disk drive. As seen from FIG. 12, this system includes a sync data introduction circuit 22, a head 19 for performing the read/write of a signal on a medium such as a magnetic disk, an R/W amplifier 20 for amplifying the signal, a pulse detector circuit 21 for creating a code pulse from the read signal, a PLL 4 for generating a clock phase-locked with the code pulse, an encoder/decoder 23 for encoding a record code and decoding it, an HDC (hard disk controller) 24 for controlling data, an I/F (interface) 25 for data transfer, a CPU 26 for controlling I/F 25, HDC 24 and I/F 24, and a host 27 for processing the data. The pulse detector has functions of pulse slimming and peak detecting for creating the code pulse. The functions of the pulse detector and the PLL are disclosed in U.S. patent application Ser. No. 07/687,638 and can be realized by HD 153,017 available from HITACHI, LTD.

We claim:

1. A data introduction device comprising:

first creation means, receiving a read code signal corresponding to data stored on a data recording medium, for creating repeatedly first two-phase signals, the waveforms of which are inverse to each other in a substantially equal period on the basis of a change in the waveform of said read code signal;

second creation means, receiving said first two-phase signals, for creating second two-phase signals, one of which is phase offset from the other of said second two-phase signals so as to be overlapped with each other, wherein a period of said second two-phase signals is twice as long as that of said first two-phase signals; and third creation means, receiving said read code signal and said second two-phase signals, for creating a second code signal corresponding to said read code signal which shifts during one phase period of said second two-phase signals.

2. A data introduction device according to claim 1, wherein said second creation means comprises:

flip-flop means with a clock input connected to receive one of said first two-phase signals;

delay means connected with one of outputs of said flip-flop means; and gate circuit means for receiving two outputs from said flip-flop means and an output from said delay means to generate said second two-phase signals.

3. A data introduction device according to claim 1, wherein said first creation means is a phase-lock loop, wherein said second creation means comprises:

an extended window creation unit for taking in at least two-phase data each having a width of one or more bits of the data to create discrimination windows, wherein said third creation means comprises:

a latch unit for latching the data within each of said discrimination windows, and a data discrimination unit for deciding if the latched data is an error.

4. A data introduction device according to claim 3, wherein said at least two phase discrimination windows have an overlapping portion with each other.

5. A data introduction device according to claim 3, wherein said data discrimination unit for deciding if the latched data is an error has a function of estimating an error on the basis of the data pattern latched.

6. A data introduction device comprising:

first creation means, receiving a read code signal corresponding to data stored on a data recording medium, for creating repeatedly first two-phase signals, the waveforms of which are inverse to each other in a substantially equal period on the basis of a change in the waveform of said read code signal;

second creation means, receiving said first two-phase signals, for creating second two-phase signals, one of which is phase offset from the other of said second two-phase signals so as to be overlapped with each other, wherein a period of said second two-phase signals is twice as long as that of said first two-phase signals; and third creation means, receiving said read code signal and said second two-phase signals, for creating a second code signal corresponding to said read code signal which shifts during one phase period of said second two-phase signals;

wherein said third creation means comprises:

a plurality of first flip-flop means each having a clock input connected to receive said read code signal, and at least one second flip-flop means having a clock input, a signal input for receiving one of said first two-phase signals and a D input connected with each output of at least two of said plurality of first flip-flop means each connected in series to the other at least two of said plurality of first flip-flop means.

7. A data introduction device comprising:

first creation means, receiving a read code signal corresponding to data stored on a data recording medium, for creating repeatedly first two-phase signals, the waveforms of which are inverse to each other in a substantially equal period on the basis of a change in the waveform of said read code signal;

second creation means, receiving said first two-phase signals, for creating second two-phase signals, one of which is phase offset from the other of said second two-phase signals so as to be overlapped with each other, wherein a period of said second two-phase signals is twice as long as that of said first two-phase signals; and third creation means, receiving said read code signal and said second two-phase signals, for creating a second code signal corresponding to said read code signal which shifts during one phase period of said second-two phase signals;

wherein said second creation means comprises:

flip-flop means with a clock input connected to receive one of said first two-phase signals, delay means connected with one of outputs of said flip-flop means, and gate circuit means for receiving two outputs from said flip-flop means and an output from said delay means to generate said second two-phase signals, and wherein said third creation means comprises:

a plurality of first flip-flop means each having a clock input connected to receive said read code signal, and at least one second flip-flop means having a clock input, a signal input for receiving one of said first two-phase signals and a D input connected with each output of at least two of said first plurality of first flop-flop means each connected in series to the other at least two of said plurality of first flip-flop means.

8. A data introduction device comprising:

first creation means, receiving a read code signal corresponding to data stored on a data recording medium, for creating repeatedly first two-phase signals, the waveforms of which are inverse to each other in a substantially equal period on the basis of a change in the waveform of said read code signal;

second creation means, receiving said first two-phase signals, for creating second two-phase signals, one of which is phase offset from the other of said second two-phase signals so as to be overlapped with each other, wherein a period of said second two-phase signals is twice as long as that of said first two-phase signals;

third creation means, receiving said read code signal and said second two-phase signals, for creating a second code signal corresponding to said read code signal which shifts during one phase period of said second-two phase signals; and data discrimination means connected with the output from said third creation means, wherein if said output has successive bits data "1"s, said data discrimination means changes into "0" the bit data "1" adjacent to the group having more bit data "0"s of bit data "0" groups before and after said successive "1"s at issue.

9. A data introduction method comprising:

a first creation step of receiving a read code signal corresponding to data stored on a data recording medium to create repeatedly first two phase signals, the waveforms of which are inverse to each other in a substantially equal period on the basis of a change in the waveform of said read code signal;

a second creation step of receiving said first two-phase signals to create second two-phase signals, one of which is phase offset from the other of said second two-phase signals so as to be overlapped with each other, wherein a period of said second two-phase signals is twice as long as that of said first two phase signals; and a third creation step of receiving said read code signal and said second two-phase signals to create a second code signal corresponding to said read code signal which shifts during one phase period of said second two-phase signals.

10. A data introduction method according to claim 9, wherein said second creation step comprises the steps of:

supplying one of said two-phase signals to a clock input of said flip-flop means;

delaying an output from said flip-flop means; and supplying two outputs from said flip-flop means and an output from said delay means to gate circuit means to generate said second two-phase signals.

11. A data introduction method according to claim 9, wherein said first creation step is performed by a phase-lock loop, wherein said second creation step comprises the step of:

creating at least two-phase discrimination windows each having a width of one or more bits of the data, and wherein said third creation step comprises the steps of:

latching the data within each of said discrimination windows, and deciding if the latched data is an error based on the data pattern latched for all the discrimination windows.

12. A data introduction method according to claim 11, wherein said data is corrected not to include successive bits "1"s in a normally operated state.

13. A data introduction method comprising:

a first creation step of receiving a read code signal corresponding to data stored on a data recording medium to create repeatedly first two-phase signals, the waveforms of which are inverse to each other in a substantially equal period on the basis of a change in the waveform of said read code signal;

a second creation step of receiving said first two-phase signals to create second two-phase signals, one of which is phase offset from the other of said second two-phase signals so as to be overlapped with each other, wherein a period of said second two-phase signals is twice as long as that of said first two-phase signals; and a third creation step of receiving said read code signal and said second two-phase signals to create a second code signal corresponding to said read code signal which shifts during one phase period of said second two phase-signals;

wherein said third creation step comprises the steps of:

supplying said read code signal to clock inputs of a plurality of first flip-flop means; and supplying one of said first two-phase signals to a signal input of at least one second flip-flop means and supplying to a D-input of said at least one second flip-flop means each output of at least two of said plurality of first flip-flop means each connected in series to the other of said at least two of said plurality of first flip-flop means.

14. A data introduction method comprising:

a first creation step of receiving a read code signal corresponding to data stored on a data recording medium to create repeatedly first two-phase signals, the waveforms of which are inverse to each other in a substantially equal period on the basis of a change in the waveform of said read code signal;

a second creation step of receiving said first two-phase signals to create second two-phase signals, one of which is phase offset from the other of said second two-phase signals so as to be overlapped with each other, wherein a period of said second two-phase signals is twice as long as that of said first two-phase signals; and a third creation step of receiving said read code signal and said second two-phase signals to create a second code signal corresponding to said read code signal which shifts during one phase period of said second two-phase signals;

wherein said second creation step comprises the steps of:
supplying one of said first two-phase signals to a clock input of flip-flop means;
delaying one of outputs of said flip-flop means; and
supplying two outputs from said flip-flop means and said delayed output to gate circuit means to generate said second two-phase signals, and wherein said third creation step comprises the steps of:
supplying said read code signal to clock inputs of a plurality of first flip-flop means; and
supplying one of said first two-phase signals to a signal input of at least one second flip-flop means and supplying to a D-input of said flip-flop means each output of at least two of said plurality of first flip-flop means each connected in series to the other of said at least two of said plurality of first flip-flop means.

15. A data introduction method comprising:

a first creation step of receiving a read code signal corresponding to data stored on a data recording medium to create repeatedly first two-phase signals, the waveforms of which are inverse to each other in a substantially equal period on the basis of a change in the waveform of said read code signal;

a second creation step of receiving said first two-phase signals to create second two-phase signals, one of which is phase offset from the other of said second two-phase signals so as to be overlapped with each other, wherein a period of said second two-phase signals is twice as long as that of said first two-phase signals; and a third creation step of receiving said read code signal and said second two-phase signals to create a second code signal corresponding to said read code signal which shifts during one phase period of said second two-phase signals; and if said output has successive bits data "1"s, changing into "0" the bit data "1" adjacent to the group having more bit data "0"s of bit data "0" groups before and after said successive "1"s at issue.

16. A data introduction system comprising:

pulse detecting means for receiving a signal corresponding to data stored on a data recording medium and shaping its waveform to provide a read code signal; and data introducing means comprising:

first creation means, receiving a read code signal corresponding to the data stored on the data recording medium, for creating repeatedly first two-phase signals, the waveforms of which are inverse to each other in a substantially equal period on the basis of a change in the waveform of said read code signal, second creation means, receiving said first two-phase signals, for creating second two-phase signals, one of which is phase offset form the other of said second two-phase signals so as to be overlapped with each other, wherein a period of said two-phase signals is twice as long as that of said first two-phase signals, and third creation means, receiving said read code signal and said second two-phase signals, for creating a second code signal corresponding to said read code signal which shifts during one phase period of said second two-phase signals.

17. A data introduction system according to claim 16, wherein said second creation means comprises:

flip-flop means with a clock input connected to receive a first two-phase signal;

delay means connected with one of outputs of said flip-flop means; and gate circuit means for receiving two outputs from said flip-flop means and an output from said delay means to generate said second two-phase signals.

18. A data introduction system according to claim 16 wherein said first creation means is a phase-locked loop (PLL) circuit for receiving the output data from said pulse detecting means to generate a clock phase-locked with said data, wherein said second creation means comprises:
an extended window creation unit for taking in at least two-phase data each having a width of one or more bits of the data to create discrimination windows, and wherein said third creation means comprises:
a latch unit for latching the data within each of said discrimination windows, and
a data discrimination unit for deciding if the latched data is an error.

19. A data introduction system comprising:

pulse detecting means for receiving a signal corresponding to data stored on a data recording medium and shaping its waveform to provide a read code signal; and data introducing means comprising:

first creation means, receiving a read code signal corresponding to the data stored on the data recording medium, for creating repeatedly first two-phase signals, the waveforms of which are inverse to each other in a substantially equal period on the basis of a change in the waveform of said read code signal, second creation means, receiving said first two-phase signals, for creating second two-phase signals, one of which is phase offset form the other of said second two-phase signals so as to be overlapped with each other, wherein a period of said two-phase signals is twice as long as that of said first two-phase signals, and third creation means, receiving said read code signal and said second two-phase signals, for creating a second code signal corresponding to said read code signal which shifts during one phase period of said second two-phase signals wherein said third creation means comprises:
a plurality of first flip-flop means each having a clock input connected to receive said read code signal, and
at least one second flip-flop means having a clock input, a signal input for receiving one of said first two-phase signals and a D input connected with each output of at least two of said plurality of first flip-flop means each connected in series to the other of said at least two of said plurality of first flip-flop means.

20. A data introduction system comprising:

pulse detecting means for receiving a signal corresponding to data stored on a data recording medium and shaping its waveform to provide a read code signal; and data introducing means comprising:

first creation means, receiving a read code signal corresponding to the data stored on the data recording medium, for creating repeatedly first two-phase signals, the waveforms of which are inverse to each other in a substantially equal period on the basis of a change in the waveform of said read code signal, second creation means, receiving said first two-phase signals, for creating second two-phase signals, one of which is phase offset form the other of said second two-phase signals so as to be overlapped with each other, wherein a period of said two-phase signals is twice as long as that of said first two-phase signals, and third creation means, receiving said read code signal and said second two-phase signals, for creating a second code signal corresponding to said read code signal which shifts during one phase period of said second two-phase signals wherein said second creation means comprises:

flip-flop means with a clock input connected to receive a first two-phase signal, delay means connected with one of outputs of said flip-flop means, and gate circuit means for receiving two outputs from said flip-flop means and an output from said delay means to generate said second two-phase signals, and wherein said third creation means comprises:

a plurality of first flip-flop means each having a clock input connected to receive said read code signal, and at least one second flip-flop means having a clock input, a signal input for receiving one of said first two-phase signals and a D input connected with each output of at least two of said plurality of first flip-flop means each connected in series to the other of said at least two of said plurality of first flip-flop means.

21. A data introduction system comprising:

pulse detecting means for receiving a signal corresponding to data stored on a data recording medium and shaping its waveform to provide a read code signal;

data introducing means comprising:

first creation means, receiving a read code signal corresponding to the data stored on the data recording medium, for creating repeatedly first two-phase signals, the waveforms of which are inverse to each other in a substantially equal period on the basis of a change in the waveform of said read code signal, second creation means, receiving said first two-phase signals, for creating second two-phase signals, one of which is phase offset form the other of said second two-phase signals so as to be overlapped with each other, wherein a period of said two-phase signals is twice as long as that of said first two-phase signals, and third creation means, receiving said read code signal and said second two-phase signals, for creating a second code signal corresponding to said read code signal which shifts during one phase period of said second two-phase signals; and data discrimination means connected with the output from said third creation means, wherein if said output has successive bits data "1"s, said data discrimination means changes into "0" the bit data "1" adjacent to the group having more bit data "0"s of bit data "0" groups before and after said successive "1"s at issue.

* * * * *